(12) United States Patent
Bacon (10) Patent No.: US 12,264,516 B2
(45) Date of Patent: Apr. 1, 2025

(54) INTERLOCK ASSEMBLY FOR A TRUCK CAP

(71) Applicant: BAUER PRODUCTS, INC., Grand Rapids, MI (US)

(72) Inventor: Bruce C. Bacon, Rockford, MI (US)

(73) Assignee: BAUER PRODUCTS, INC., Grand Rapids, MI (US)

( * ) Notice: Subject to any disclaimer, the term of this patent is extended or adjusted under 35 U.S.C. 154(b) by 99 days.

(21) Appl. No.: 18/130,140

(22) Filed: Apr. 3, 2023

(65) Prior Publication Data

US 2024/0328215 A1 Oct. 3, 2024

(51) Int. Cl.
*E05B 83/16* (2014.01)
*B60J 7/16* (2006.01)
*E05B 81/06* (2014.01)

(52) U.S. Cl.
CPC ............ *E05B 83/16* (2013.01); *B60J 7/1607* (2013.01); *E05B 81/06* (2013.01)

(58) Field of Classification Search
CPC .......... E05B 83/16; E05B 81/06; B60J 7/1607
USPC ....................................................... 292/216
See application file for complete search history.

(56) References Cited

U.S. PATENT DOCUMENTS

| | | | | |
|---|---|---|---|---|
| 6,005,306 | A * | 12/1999 | Pickard | E05B 47/0047 340/12.5 |
| 6,309,008 | B1 * | 10/2001 | Bacon | B62D 25/12 292/38 |
| 7,401,484 | B1 * | 7/2008 | Holmes | E05B 13/10 70/423 |
| 10,889,169 | B2 * | 1/2021 | Mcdonald, II | E05B 83/18 |
| 11,433,751 | B2 * | 9/2022 | Ireland | B60J 7/1607 |
| 2015/0279137 | A1 * | 10/2015 | Bacon | E05B 81/66 70/278.1 |
| 2018/0016810 | A1 * | 1/2018 | Bacon | E05B 81/66 |
| 2020/0224462 | A1 * | 7/2020 | Renner | E05B 47/026 |
| 2020/0240183 | A1 * | 7/2020 | Bacon | E05B 85/13 |

FOREIGN PATENT DOCUMENTS

CA 3101456 A1 9/2021

* cited by examiner

*Primary Examiner* — Kristina R Fulton
*Assistant Examiner* — James Edward Ignaczewski
(74) *Attorney, Agent, or Firm* — PRICE HENEVELD LLP (57) ABSTRACT

An interlock assembly for a door of a cap configured to cover a bed of a vehicle includes a strike assembly coupled with a structural component of the cap and including a strike. The interlock assembly further includes a latch assembly coupled with the door. The latch assembly comprising a latch selectively engaging the strike, a cam configured to move the latch between an extended position in which the latch engages the strike and a retracted position in which the latch is disengaged from the strike, a biasing member operably coupling the latch with the cam, the biasing member configured to bias the latch toward the extended position, and a first handle proximate an inside of the bed and mechanically linked with the latch, wherein the first handle is configured to move the latch between the extended position and the retracted position.

19 Claims, 4 Drawing Sheets

INTERLOCK ASSEMBLY FOR A TRUCK CAP

FIELD OF THE DISCLOSURE

The present disclosure generally relates to interlocking assemblies for doors configured to cover a bed of a vehicle and, more particularly, to an interlock assembly for a door of a truck that can be actuated from both the interior and the exterior of a bed of the truck and may be operated remotely.

BACKGROUND OF THE DISCLOSURE

Conventional covers for truck beds typically include at least one twistable lock on a pivotable door of the cover for locking the door or unlocking the door. These locks may engage a sidewall of the cover when the door is closed and the twistable lock is twisted to a first position. Typically, movable interfaces between the twistable lock and the sidewall are not included, thereby requiring a user to move the twistable lock to an unlocked position prior to opening the door. Further, these conventional locks may lack manipulatable members accessible from the truck bed, such that egress from the truck bed when the twistable locks are locked may be limited. Further, conventional doors of truck caps need to be unlocked at both sides of the door in order to open the door. Accordingly, a need for a more dynamic and accessible assembly is presented.

SUMMARY OF THE DISCLOSURE

According to a first aspect of the present disclosure, an interlock assembly for a door of a cap configured to cover a bed of a vehicle includes a strike assembly coupled with a structural component of the cap and including a strike. The interlock assembly further includes a latch assembly coupled with the door. The latch assembly comprises a latch selectively engaging the strike, a cam configured to move the latch between an extended position in which the latch engages the strike and a retracted position in which the latch is disengaged from the strike, a biasing member operably coupling the latch with the cam, the biasing member configured to bias the latch toward the extended position, and a first handle proximate an inside of the bed and mechanically linked with the latch. The first handle is configured to move the latch between the extended position and the retracted position.

According to a second aspect of the present disclosure, a latch assembly for a door of a cap configured to cover a bed of a vehicle includes a latch selectively engaging a strike operably coupled with a structural component of the cap. The latch assembly further includes a cam configured to move the latch between an extended position in which the latch engages the strike and a retracted position in which the latch is disengaged from the strike. The latch assembly further includes a biasing member operably coupling the latch with the cam, the biasing member configured to bias the latch toward the extended position. The latch assembly further includes a first handle proximate an inside of the bed and mechanically linked with the latch. The first handle is configured to move the latch between the extended position and the retracted position.

According to a third aspect of the present disclosure, an interlock assembly for a door of a cap configured to cover a bed of a vehicle includes a strike assembly coupled with a structural component of the cap and including a strike. The interlock assembly further includes a control circuit having an electromechanical actuator operably coupled with the strike to selectively allow and limit movement of the strike in response to electrical power applied to the electromechanical actuator. The interlock assembly further includes a latch assembly coupled with the door. The latch assembly includes a latch selectively engaging the strike and having a first side and a second side, opposite the first side, each extending toward a distal end of the latch, the first side tapering toward the second side at the distal end. The interlock assembly further includes a cam configured to move the latch between an extended position in which the latch engages the strike and a retracted position in which the latch is disengaged from the strike. The interlock assembly further includes a biasing member operably coupling the latch with the cam, the biasing member configured to bias the latch toward the extended position. The interlock assembly further includes a first handle proximate an inside of the bed and mechanically linked with the latch. The first handle is configured to move the latch between the extended position and the retracted position. The electromechanical actuator is configured to release the strike in response to electrical power applied to the electromechanical actuator to allow the second surface to deflect the strike.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

Figure 1:
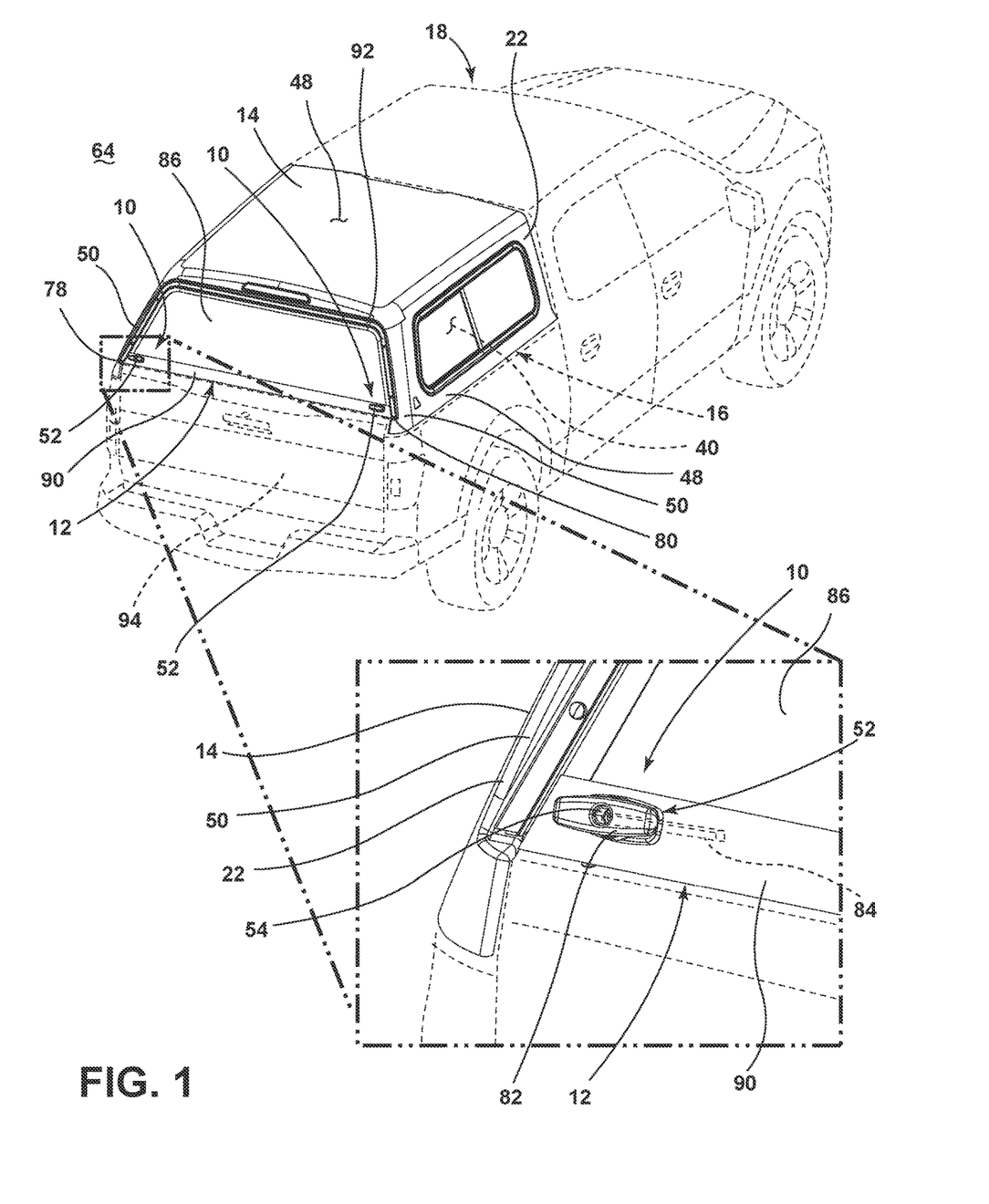
FIG. 1 is a perspective view of a truck incorporating a cap that has an interlocking assembly constructed according to at least one aspect of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an interlock assembly for a truck cap. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-5, an interlock assembly 10 for a door 12 of a cap 14 configured to cover a bed 16 of a vehicle 18 is generally indicated at 10. The interlock assembly 10 includes a strike assembly 20 coupled with a structural component 22 of the cap 14. The strike assembly 20 includes a strike 24. The interlock assembly 10 further includes a latch assembly 26 coupled with the door 12. The latch assembly 26 includes a latch 28 selectively engaging the strike 24. The latch assembly 26 further includes a cam 30 configured to move the latch 28 between an extended position in which the latch 28 engages the strike 24 and a retracted position in which the latch 28 is disengaged from the strike 24. A biasing member 36, perhaps best shown in FIG. 3, operably couples the latch 28 with the cam 30. The biasing member 36 is configured to bias the latch 28 toward the extended position. The latch assembly 26 further includes a first handle 38 proximate an inside 40 of the bed 16 and mechanically linked with the latch 28. The first handle 38 is configured to move the latch 28 between the extended position and the retracted position. According to some examples, the first handle 38 includes a body 42 and a tab 44 extending from the body 42. The tab 44 may be configured to slide the body 42 toward and away from the latch 28.

In general, the present interlock assembly 10 may utilize the strike 24 as an electric strike 24 and provide a spring-loaded plunger 46 of the latch assembly 26 to open and/or close the door 12 of the vehicle 18. The electric strike 24 is selectively lockable depending on energization of the electric strike 24. In use, the interlock assembly 10 may provide for the door 12 being allowed to slam shut without requiring rotating to be secured with the structural component 22 of the cap 14 (e.g., a wall 48 or a pillar 50 of the cap 14). Further, the interlock assembly 10 may provide for egress from the inside 40 of the bed 16 when the cap 14 is shut closed. For example, the door 12 may be opened by pulling the first handle 38, or pull-tab, to disengage the latch 28 from the strike assembly 20. The interlock assembly 10 may further provide for remote control of the strike 24 to allow the door 12 to be opened when the door 12 is closed and locked with the structural component 22. Further, such remote activations/deactivation may allow for the door to be opened from any side of the door 12 (e.g., the right or left sides) without manually unlocking the door 12.

With continued reference to FIGS. 1-5, generally, the interlock assembly 10 may further include a second handle 52 operably coupled with the cam 30 and exterior to the bed 16. The second handle 52 may be rotatable to drive the cam 30 between a first angular position corresponding to the extended position and a second angular position corresponding to the retracted position. In some examples, the second handle 52 includes a keyed lock 54 configured to selectively limit rotation of the second handle 52 and the cam 30 in a locked state of the latch assembly 26. The cam 30 may be configured to remain in the first angular position in response to a translation of the first handle 38 away from the latch 28.

In some examples, the interlock assembly 10 further includes an electromechanical actuator 56 operably coupled with the strike 24 to selectively limit the movement of the strike 24 in a locked state of the strike assembly 20 and allow movement of the strike 24 in an unlocked state of the strike assembly 20. The latch 28 has a first side 58 and a second side 60, opposite the first side 58. Each of the first and second sides 58, 60 extend toward a distal end 62 of the latch 28, with the first side 58 tapering toward the second side 60 at the distal end 62. The door 12 is pivotable between a closed position and an open position. In the open position, the door 12 is rotated away from the inside 40 of the bed 16 (e.g., toward a region exterior 64 of the cap 14). The latch 28 is configured to move toward the retracted position in response to the first side 58 engaging the strike 24 when the strike assembly 20 is in the locked state and the door 12 moves toward the closed position. The door 12 may be movable from the closed position toward the open position in response to the strike assembly 20 being in the unlocked state.

According to some examples, the latch assembly 26 further includes a control circuit 66 having the electromechanical actuator 56 operably coupled with the strike 24 to selectively allow and limit movement of the strike 24 in response to electrical power being applied to the electromechanical actuator 56. An electrical connection 68 may interpose the control circuit 66 and an electrical power supply 70 of the vehicle 18 configured to supply electrical power to the control circuit 66. In some examples, electrical connection 68 is omitted, and the electrical power is provided by an onboard power supply 72, such as a battery, or another power source. A switch 74 electrically interposes the electrical connection 68 and the electromechanical actuator 56 to selectively supply the electrical power to the electromechanical actuator 56 in response to an activation signal applied to the switch 74. In some examples, a wireless communication circuit 76 is provided in communication with the switch 74 and is configured to selectively supply the activation signal to the switch 74 to control the movement of the strike 24.

The electromechanical actuator 56 may be configured to release the strike 24 in response to the electrical power applied to the electromechanical actuator 56. This may allow the second side 60 of the latch 28 to deflect the strike 24. The electromechanical actuator 56 may further be configured to secure the strike 24 in response to a lack of the electrical power applied to the electromechanical actuator 56.

Referring now more particularly to FIG. 1, the interlock assembly 10 is illustrated as a pair of interlock assemblies with one interlock assembly 10 disposed at a first end 78 of the door 12 and another interlock assembly 10 disposed at a second end 80 of the door 12. In this example, it is contemplated that the latch assembly 26 disposed at the first end 78 of the door 12 may have a right-hand orientation, and the latch assembly 26 at the second end 80 of the door 12 may have a left-hand orientation. In this way, the present interlock assembly 10 may be provided having two mirrored configurations that are structurally matching but have orientations opposite one another.

The second handle 52 of each interlock assembly 10 may include a knob 82 that is T-shaped. The knob 82 may allow for user manipulation to rotate the second handle 52 to drive the cam 30 between the first and second angular positions. The knob 82 may be rotatable relative to a shaft 84 of the handle in an unlocked state of the second handle 52 and may be secured with the shaft 84 in a locked state of the second handle 52. For example, the keyed lock 54 may be provided on the knob 82 and may be configured to secure the knob 82 with the shaft 84 upon rotation of a key that mates with the keyed lock 54. Accordingly, the keyed lock 54 may allow for manual locking and/or unlocking of the door 12 with the structural component 22 of the cap 14. However, as will be described further herein, the strike assembly 20 may be controlled to allow the strike 24 to deflect in response to a user pulling on the door 12 to move the door 12 to the open position. Accordingly, the interlock assembly 10 may provide for dynamic operation by allowing for multiple access methods to the bed 16 of the vehicle 18.

Still referring to FIG. 1, the door 12 may have an optically transmissible portion, such as a window 86, in a central portion 88 of the door 12, and an outer portion 90 upon which the latch assembly 26 is mounted. For example, metallic or composite materials may be employed in the outer portion 90 to provide rigidity to the door 12 and couple with the window 86. The door 12 may be pivotable between the open and closed positions about a hinged connection 92 disposed along an upper portion of the door 12. The pivotal connection may allow the door 12 to be rotated upward and away from the inside 40 of the bed 16 when moving toward the open position. Although not illustrated in detail, the door 12 may incorporate dampers, such as pneumatic dampers, disposed along each end of the door 12 between the door 12 and the structural component 22 to bias the door 12 toward the open position when the door 12 is being opened and closed position when the door 12 is being closed.

With continued reference to FIG. 1, the interlock assembly 10 of the present disclosure may provide for the dynamic locking and/or unlocking capabilities described above by providing the strike assembly 20 with electrical activation and maintaining mechanical actuation of the latch assembly 26. Because the latch assembly 26 is provided on the door 12 and the strike assembly 20 is provided on the structural component 22 in some examples, wiring and/or forming of electrical conductors on the door 12, such as on the window 86 or in the glass of the window 86, may be limited, and the interlock assembly 10 may still provide for the selective operation. Stated differently, electrical power may be provided in the structural component 22 of the cap 14 and not in the door 12 to limit manufacturing complexity and provide ease-of-use for the user. For example, wiring may be hidden within the structural components 22 more easily and cost-effectively than in or on the door 12, in some examples. Such enhancements may still be achieved without requiring electrical conductors to be provided on both the door 12 and the structural component 22. This may limit harnesses or other mechanisms that allow movement of wiring that limit wear or damage to the wiring when the wiring is moved. Accordingly, such complex harness systems may be omitted due to the wiring being provided in the structural component 22 of the cap 14.

Figure 2:
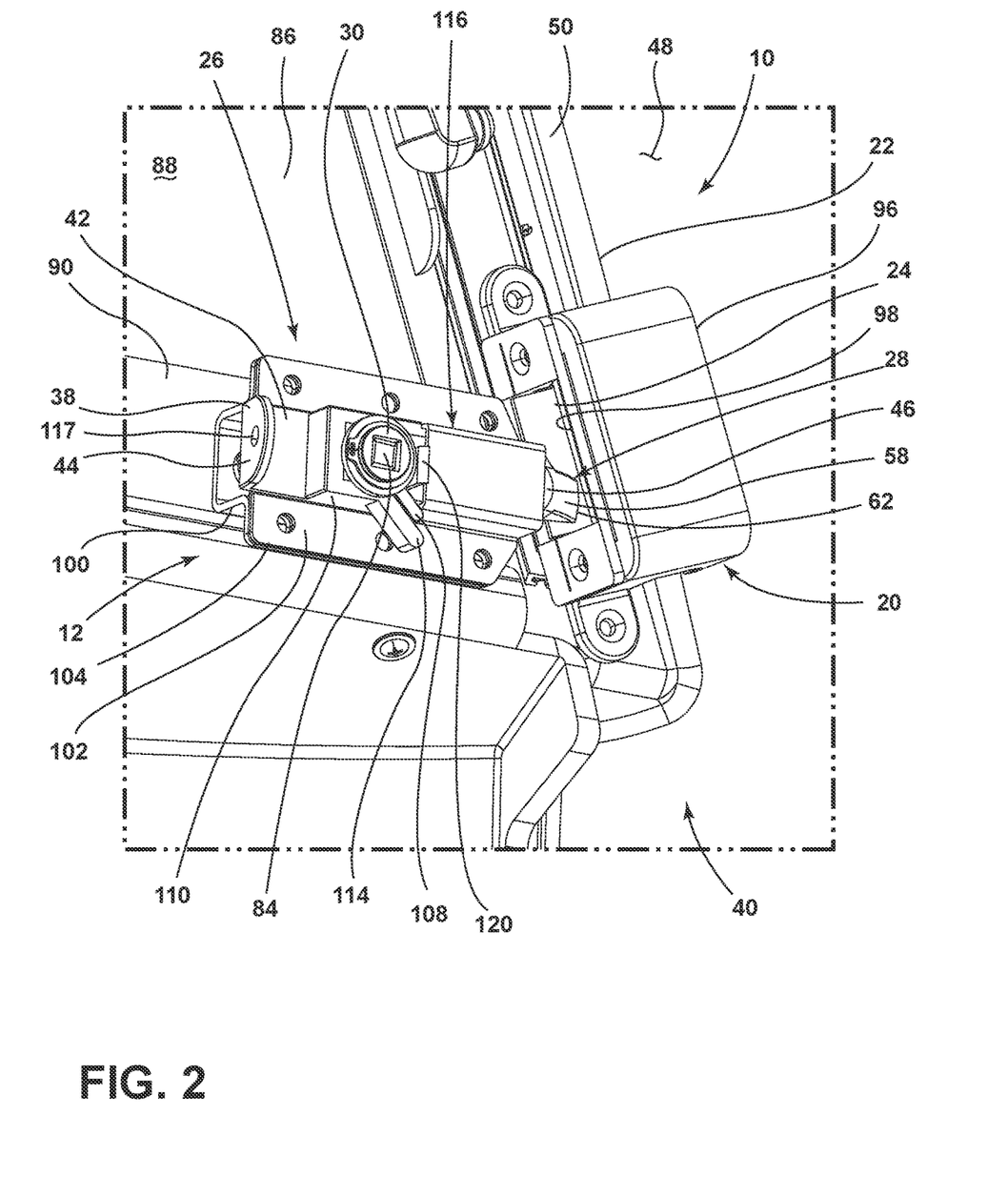
FIG. 2 is a perspective view of an interlock assembly viewed from a bed of a truck incorporating the interlock assembly of FIG. 1.
Figure 3:
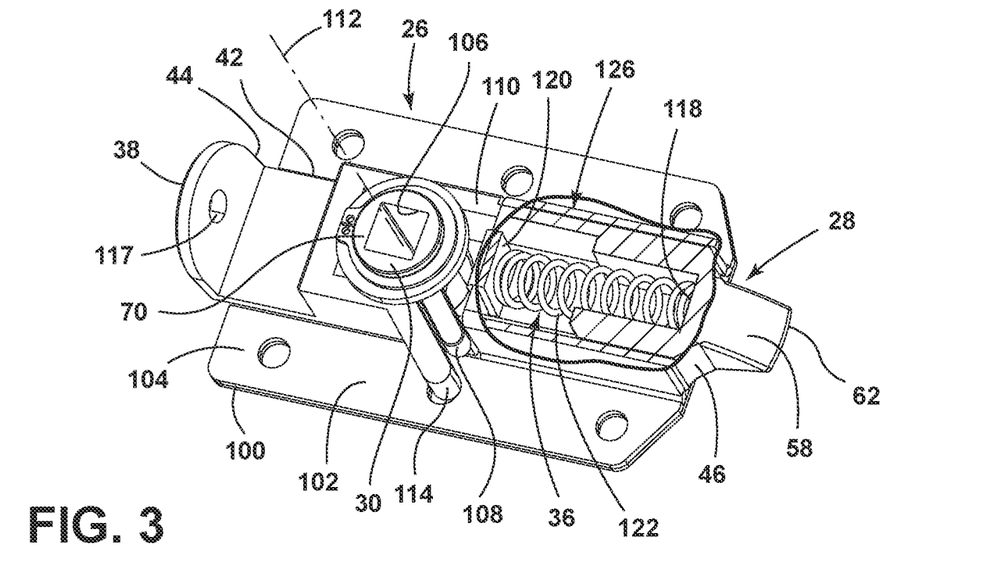
FIG. 3 is a perspective view of the latch assembly of FIG. 2 illustrating a biasing member inside a casing of the latch assembly.

Referring now to FIGS. 2 and 3, the latch assembly 26 interacts with the strike assembly 20 in the interior of the bed 16. The strike assembly 20 includes a housing 96 formed around the strike 24 and supporting the strike 24. The housing 96 and the strike 24 define a receptacle 98 in which the latch 28 of the latch assembly 26 may be disposed in the extended position of the latch 28. In this example, the second side 60 of the latch 28 at the distal end 62 engages the strike 24 to secure the door 12 with the structural component 22 of the cap 14. It is contemplated that, although illustrated with fasteners removed, fasteners such as screws, bolts, adhesives, or the like may secure the housing 96 with the structural component 22 and the latch assembly 26 with the outer portion 90 of the door 12. In some examples, the strike assembly 20 is formed within the structural component 22 of the cap 14. For example, the strike assembly 20 may be flush inside the pillar 50 or may be integrally formed with the portion of the pillar 50. For example, the housing 96 may be omitted or replaced by a space formed by the pillar 50 or another structural component 22 of the cap 14. Accordingly, the housing 96 may refer to an object surrounding the receptacle 98 and defining the receptacle 98 that receives the latch 28.

Referring particularly to the latch assembly 26 shown in FIGS. 2 and 3, a pair of mounting plates 100, 102 may be provided in the inside 40 of the bed 16 and on the outer portion 90 of the door 12. For example, the pair of mounting plates 100, 102 may include an inner mounting plate 100 abutting the outer portion 90 of the door 12 and an outer mounting plate 102 mounted to the inner mounting plate 100. The fasteners may be provided between the inner and outer mounting plates 100, 102 along a periphery 104 of the inner and outer mounting plates 100, 102. The latch 28 and other movable portions of the latch assembly 26 may be linked with the outer mounting plate 102. For example, the cam 30 may define a slot 106 for receiving a rod of the second handle 52. As depicted, the shaft 84 may have a square-shaped cross-section, and the rod may also have a square-shaped cross-section to mate with the receptacle 98.

With continued reference to FIGS. 2 and 3, the cam 30 may further include an extension 108. The extension 108 may engage a transmission member 110 that mechanically interposes the cam 30 and the latch 28. In the illustrated example, the transmission member 110 is unitary with the latch 28 and the first handle 38. However, it is contemplated that the transmission member 110 may be an independent component of the latch assembly 26 that may be selectively driven by the first handle 38 and/or may drive the latch 28. For example, the extension 108 may extend radially outwardly from the slot 106, and, upon rotation of the second handle 52, the extension 108 may rotate about a central axis 112 through the slot 106 and engage a projection 114 of the transmission member 110 to cause the transmission member 110 to translate or otherwise move to cause translation of the latch 28. In this way, rotation of the second handle 52 from the region exterior 64 may cause the latch 28 to move from the extended position to the retracted position. Alternatively, and as will be further described herein, the second handle 52 may be manipulated to directly pull or push the latch 28 and/or transmission member 110 between the retracted and extended positions.

With continued reference to FIGS. 2 and 3, the latch assembly 26 may include a casing 116 coupled with the outer mounting plate 102. The casing 116 overlays the latch 28 and is operably coupled with the mounting plates 100, 102. The casing 116 may be configured to limit the latch 28 from moving in a direction other than toward or away from the extended and/or retracted position. For example, the casing 116 may limit the latch 28 from deflecting outwardly or in a direction parallel with the central axis 112. Further, the casing 116 may include a back wall 120 positioned between the cam 30 and the distal end 62 of the latch 28 for interacting with the plunger 46 to influence movement of the latch 28.

In some examples, a single T-handle is configured to open the door 12. For example, the first handle 38 may define a hole 117 that receives a rod or other mechanism to interconnect with another latch assembly 26 that does not have a T-handle. In this way, the present latch 28 may be employed with a single arrangement that interlocks across various parts of the door 12 with the frame or pillar 50. Furthermore, this arrangement may provide a keyless solution to the T-handle actuated doors and may provide for manual and keyless operation as well as a fast-closing feature (the door 12 can be "slammed" shut without rotating cams). This arrangement can be modified for commercial truck caps or any door 12 with a 12V power source, such as those for recreational vehicles (RVs).

Referring more particularly to FIG. 3, the biasing member 36 is disposed in the casing 116 and surrounds the plunger 46 of the latch 28. The plunger 46 may refer to a body of the latch 28 extending between a proximal end 118 disposed in the casing 116 and the distal end 62 outside of the casing 116. The biasing member 36 may be a spring 122 which may be compressible or retractable and provide an oppositional force between the casing 116 and the plunger 46. For example, the spring 122 may be sandwiched between the back wall 120 of the casing 116 and the proximal end 118 of the plunger 46, as depicted. It is contemplated that the spring 122 may be compressible between any two parts of the latch assembly 26 that allows the latch 28 to be biased toward the extended position.

Still referring to FIG. 3, the spring 122 may be resilient and provide an expansion force in a direction common to the retraction/extension 108 direction of the latch 28 in response to compression of the spring 122. For example, when the latch 28 is in the retracted position, the plunger 46 may be in the casing 116 and the spring 122 may provide a biasing force to push the latch 28 toward the extended position. Accordingly, the configuration of the cam 30, the transmission member 110, the biasing member 36, and the plunger 46 may, in a rested state of the latch assembly 26, cause the latch 28 to be in the extended position. Accordingly, upon closing of the door 12 with no other forces imposed on the latch assembly 26, the latch assembly 26 may lock with the strike assembly 20 and prevent movement of the door 12 to the open position.

With continued reference to FIG. 2, the first handle 38 may be directly linked with the latch via the body 42 of the first handle 38 and may be configured to pull the latch 28 from the retracted position to the extended part from the extended position toward the retracted position without interaction with the cam 30. For example, when the first handle 38 is pulled in a direction common to the latch 28 moving toward the retracted position, the cam 30 may not rotate due to the projection 114 translating away from the extension 108. Stated differently, sliding the first handle 38 may pull the latch 28 toward the retracted position without rotation of the cam 30. Accordingly, the first handle 38 may provide for opening the door 12 from the inside 40 of the bed 16 without causing rotation of the second handle 52.

Figure 4A:
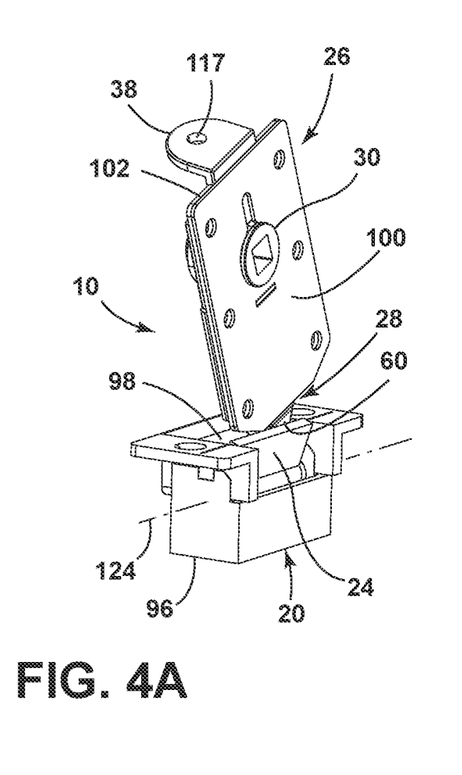
FIG. 4A is a perspective view of an interlock assembly having a latch assembly engaging a strike of the interlock assembly in a locked state.
Figure 4B:
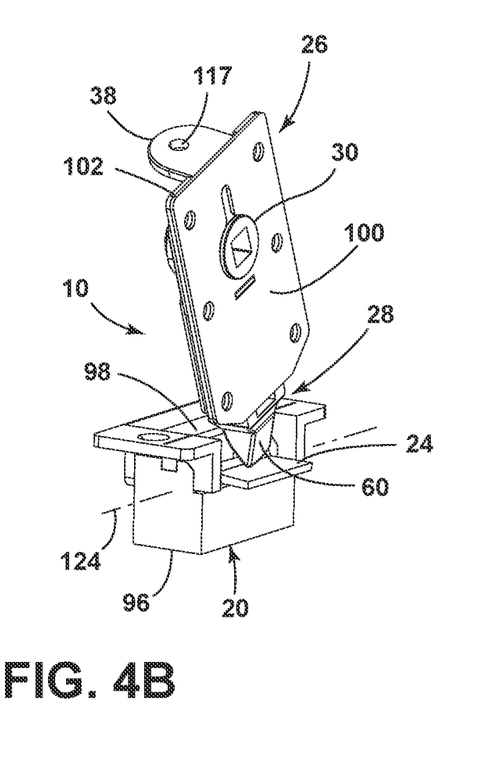
FIG. 4B is a perspective view of the latch assembly engaging the strike in an unlocked state of the strike assembly.

Referring now to FIGS. 4A and 4B, an exemplary unlatching operation between the latch assembly 26 and the strike assembly 20 is generally illustrated with the strike 24 being in the locked state and moving to the unlocked state of the strike assembly 20. As depicted, the latch 28 may be configured to rotate outwardly about a rotational axis 124 and away from the receptacle 98 upon force being applied to the strike 24 by the second side 60 of the latch 28. For example, upon the electromechanical actuator 56 (see FIG. 5) being energized, the latch 28 may be configured to rotate about the rotational axis 124 upon the door 12 being moved toward the open position. When the electromechanical actuator 56 is deactivated, the strike 24 may be secured or maintained in an upright position, as depicted in FIG. 4A. As depicted in FIG. 4B, the strike 24 may deflect outwardly in response to activation of the electromechanical actuator 56 to allow the door 12 to open or close independent of retraction of the latch 28 and, therefore, independent of the locked state of the second handle 52. Accordingly, in operation, if the second handle 52 is in a locked state and the door 12 is in the closed position, a user may, via the wireless communication circuit 76 (FIG. 5) or another electronic access interface, release the lock on the strike 24, and the door 12 may be open, regardless of the locked state. In this way, the door 12 may be open without unlocking each knob 82 (or each second handle 52) prior to opening the door 12. This functionality may also be employed for a user disposed in the inside 40 of the bed 16. Thus, a user when inside 40 of the bed 16 may either or both manipulate the first handle 38 to retract the latch 28 and/or electronically release the strike 24 to allow the door 12 to be opened to allow egress from the inside 40 of the bed 16.

Figure 5:
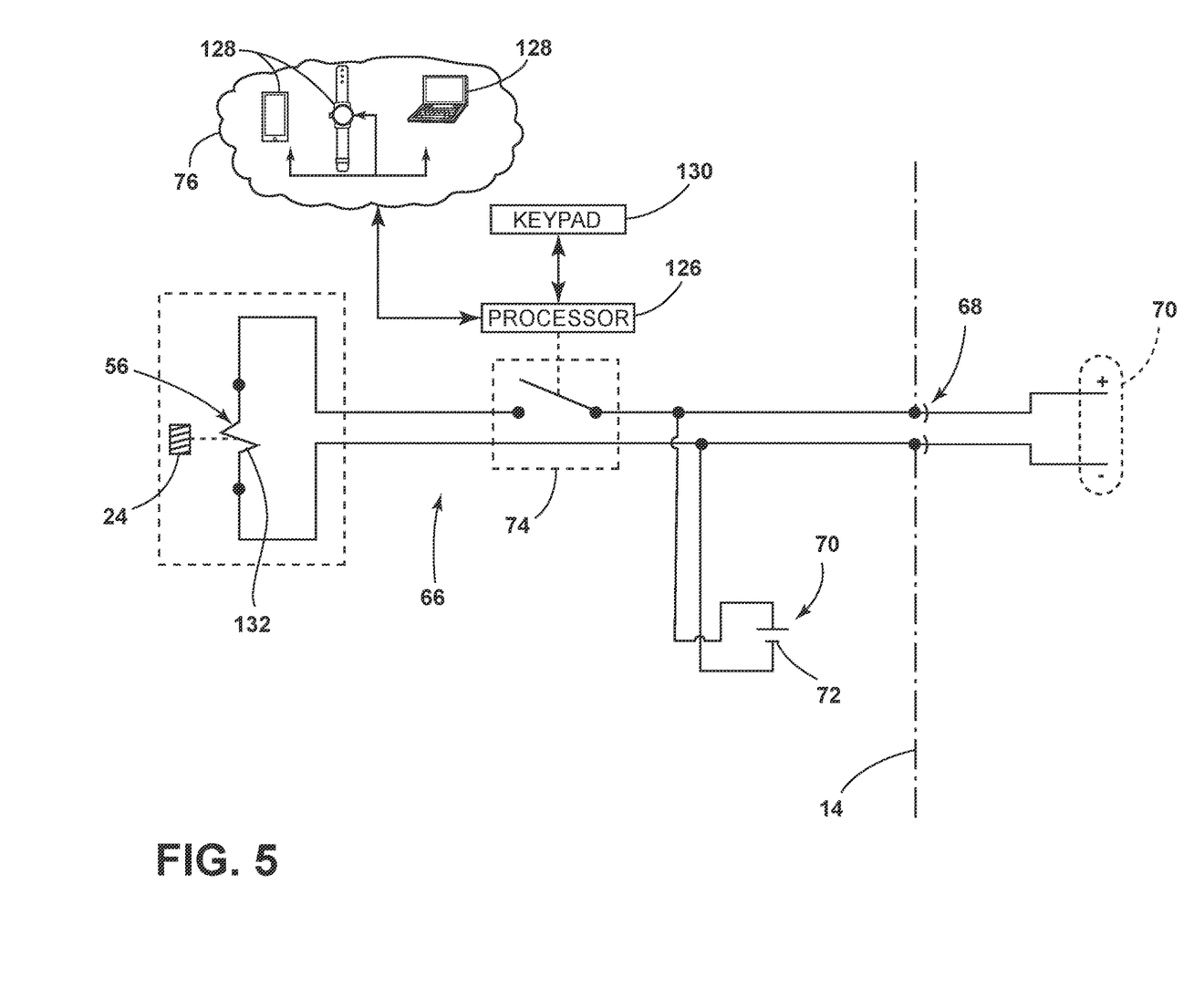
FIG. 5 is a schematic view of a control circuit of an interlock assembly constructed according to one aspect of the present disclosure.

Referring now to FIG. 5, the control circuit 66 may control actuation of the electromechanical actuator 56 to allow selective release or securing of the latch 28 to control the locked state or the unlocked state of the strike assembly 20. As previously described, the electrical power supply 70 may be the electrical power supply 70 of the vehicle 18 or may be a local electrical power supply 70 associated with the truck or truck bed 16. In the example in which the power from the vehicle 18 is utilized, the electrical connector may extend between the cap 14 and a passenger compartment of the vehicle 18 or another compartment of the vehicle 18, and may connect with a battery of the vehicle 18. The control circuit 66 may be operable in any voltage configured to actuate the electromechanical actuator 56, but in a preferred example, the voltage is between 10 and 15 volts, direct-current (VDC). In some examples, the voltage is 12 VDC. It is contemplated that alternate current voltage (VAC) may be employed for the control circuit 66 in other examples.

Still referring to FIG. 5, the switch 74 may interpose the electrical power supply 70 and the electromechanical actuator 56 to control the electrical power to the electromechanical actuator 56. The switch 74 may include a transistor or other switching circuitry that may selectively allow the electrical power to be applied to the electromechanical actuator 56. For example, a processor 126 may be provided with the switch 74 or in communication with the switch 74 for controlling the electrical power to the electromechanical actuator 56. Thus, the switch 74 employed may be a mechanical or computational switch 74 that interrupts the electrical power to the electromechanical actuator 56. The switch 74 may be controlled by the wireless communication circuit 76 and/or a user interface 128, such as a keypad 130, in communication with the switch 74. For example, an alphanumeric keypad 130 may be provided with the truck or remotely from the truck (e.g., on a mobile device). Thus, the interlock assembly 10 may be preprogrammed or may be programmable to a particular alphanumeric input via the wireless communication circuit 76 and/or the user interface 128 to allow selective activation of the electromechanical actuator 56.

The control energizes the electromechanically actuator 56 for a predetermined period of time to allow the strike 24 to rotate if there is a force applied to the door 12 to open it. If no force is applied, the strike 24 remains in a closed orientation. The strike 24 is spring-loaded to the closed orientation. The spring 122 may weak enough to allow the door 12 to be opened when the coil 56 is energized.

In general, the processor 126, the wireless communication circuit 76, and/or the user interface 128 may be provided to send a signal to the switch 74 to close or open the switch 74 to activate or deactivate the electromechanical actuator 56. In some examples, the electromechanical actuator 56 is a solenoid 132 that may extend or retract to lock or unlock the rotational axis 124 of the strike 24. In other examples, the electromechanical actuator 56 is another type of electromechanical actuator 56 configured to provide a latching force or release a latching force on the strike 24. It is contemplated that the switch 74 may be a normally-open contact of a relay, such that energizing the relay may close the control circuit 66 to allow the rotational axis 124 to be unlocked and the strike 24 to be pivotable.

In general, the present interlock assembly 10 may provide for a more dynamic and user-friendly experience for accessing the inside 40 of the truck bed 16 or exiting the inside 40 of the truck bed 16. By providing electronic access and selective mechanical access, the interlock assembly 10 of the present disclosure may provide for enhanced locking and/or unlocking processes for the door 12 of the vehicle 18.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An interlock assembly for a door of a cap configured to cover a bed of a vehicle, the interlock assembly comprising:
   a strike assembly coupled with a structural component of the cap and including a strike;
   a latch assembly coupled with the door, the latch assembly comprising:
   a latch selectively engaging the strike;
   a cam configured to move the latch between an extended position in which the latch engages the strike and a retracted position in which the latch is disengaged from the strike;
   a biasing member operably coupling the latch with the cam, the biasing member configured to bias the latch toward the extended position; and
   a first handle proximate an inside of the bed and mechanically linked with the latch, wherein the first handle is configured to move the latch between the extended position and the retracted position;
   a transition member integrally and unitarily formed with the latch and the first handle;
   wherein the first handle comprises a pull tab and is disposed on a proximate end of the transition member and the latch is disposed on an opposed distal end of the transition member; and
   wherein the transition member is adapted for sliding movement upon pulling of the first handle from an extended position to a retracted position to displace the transition member and to displace the latch to the retracted position without movement of the cam.

2. The interlock assembly of claim 1, further comprising:
   a second handle operably coupled with the cam, the second handle rotatable to drive the cam between a first angular position corresponding to the extended position and a second angular position corresponding to the retracted position.

3. The interlock assembly of claim 2, wherein the second handle includes a keyed lock configured to selectively limit rotation of the second handle and the cam in a locked state of the latch assembly.

4. The interlock assembly of claim 1, further comprising:
   an electromechanical actuator operably coupled with the strike to selectively limit the movement of the strike in a locked state of the strike assembly and allow movement of the strike in an unlocked state of the strike assembly.

5. The interlock assembly of claim 4, wherein the latch includes a first side and a second side, opposite the first side, each extending toward a distal end of the latch, the first side tapering toward the second side at the distal end.

6. The interlock assembly of claim 4, wherein the door is pivotable between a closed position and an open position in which the door is rotated away from the inside of the bed, and wherein the latch is configured to move toward the retracted position in response to the first side engaging the strike when the strike assembly is in the locked state and the door moves toward the closed position.

7. The interlock assembly of claim 6, wherein the door is moveable from the closed position toward the open position in response to the strike assembly being in the unlocked state.

8. The interlock assembly of claim 1, further comprising:
a control circuit having an electromechanical actuator operably coupled with the strike to selectively allow and limit movement of the strike in response to electrical power applied to the electromechanical actuator.

9. The interlock assembly of claim 8, further comprising:
an electrical connection interposing the control circuit and an electrical power supply of the vehicle for supplying the electrical power to the control circuit.

10. The interlock assembly of claim 9, wherein the control circuit includes:
a switch electrically interposing the electrical connection and the electromechanical actuator and selectively supplying the electrical power to the electromechanical actuator in response to an activation signal.

11. The interlock assembly of claim 10, further comprising:
a wireless communication circuit in communication with the switch and configured to selectively supply the activation signal to the switch to control the movement of the strike.

12. The interlock assembly of claim 10, wherein the electromechanical actuator is configured to release the strike in response to the electrical power applied to the electromechanical actuator to allow the second side to deflect the strike.

13. The interlock assembly of claim 12, wherein the electromechanical actuator is configured to secure the strike in response to a lack of the electrical power applied to the electromechanical actuator.

14. The interlock assembly of claim 1, wherein the first handle includes a body and a tab extending from the body, the tab configured to slide the body toward and away from the latch.

15. A latch assembly for a door of a cap configured to cover a bed of a vehicle, the latch assembly comprising:
a latch selectively engaging a strike operably coupled with a structural component of the cap;
a cam configured to move the latch between an extended position in which the latch engages the strike and a retracted position in which the latch is disengaged from the strike;
a biasing member operably coupling the latch with the cam, the biasing member configured to bias the latch toward the extended position;
a first handle proximate an inside of the bed and mechanically linked with the latch, wherein the first handle is configured to move the latch between the extended position and the retracted position; and
a transition member integrally and unitarily formed with the latch and the first handle;
wherein the first handle comprises a pull tab and is disposed on a proximate end of the transition member and the latch is disposed on an opposed distal end of the transition member; and
wherein the transition member is adapted for sliding movement upon pulling of the first handle from an extended position to a retracted position to displace the transition member and to displace the latch to the retracted position without movement of the cam.

16. The latch assembly of claim 15, further comprising:
a second handle operably coupled with the cam, the second handle rotatable to drive the cam between a first angular position corresponding to the extended position and a second angular position corresponding to the retracted position.

17. The latch assembly of claim 16, wherein the second handle includes a keyed lock configured to selectively limit rotation of the second handle and the cam in a locked state of the latch assembly.

18. The latch assembly of claim 17, wherein the cam is configured to remain in the first angular position in response to a translation of the first handle away from the latch.

19. An interlock assembly for a door of a cap configured to cover a bed of a vehicle, the interlock assembly comprising:
a strike assembly coupled with a structural component of the cap and including a strike;
a control circuit having an electromechanical actuator operably coupled with the strike to selectively allow and limit movement of the strike in response to electrical power applied to the electromechanical actuator; and
a latch assembly coupled with the door, the latch assembly comprising:
a latch selectively engaging the strike and having a first side and a second side, opposite the first side, each extending toward a distal end of the latch, the first side tapering toward the second side at the distal end;
a cam configured to move the latch between an extended position in which the latch engages the strike and a retracted position in which the latch is disengaged from the strike;
a biasing member operably coupling the latch with the cam, the biasing member configured to bias the latch toward the extended position;
a first handle proximate an inside of the bed and mechanically linked with the latch, wherein the first handle is configured to move the latch between the extended position and the retracted position, wherein the electromechanical actuator is configured to release the strike in response to electrical power applied to the electromechanical actuator to allow the second side to deflect the strike; and
a transition member integrally and unitarily formed with the latch and the first handle;
wherein the first handle comprises a pull tab and is disposed on a proximate end of the transition member and the latch is disposed on an opposed distal end of the transition member; and
wherein the transition member is adapted for sliding movement upon pulling of the first handle from an extended position to a retracted position to displace the transition member and to displace the latch to the retracted position without movement of the cam.

* * * * *